(12) United States Patent
Mendes de Souza

(10) Patent No.: US 10,964,290 B2
(45) Date of Patent: Mar. 30, 2021

(54) SELECTIVE REDUCTION OF PIXEL INTENSITY TO ENHANCE ENERGY EFFICIENCY DURING DISPLAY OF AN IMAGE

(71) Applicant: Disney Enterprises, Inc., Burbank, CA (US)

(72) Inventor: Alex Mendes de Souza, São Paulo (BR)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/717,879

(22) Filed: Dec. 17, 2019

(65) Prior Publication Data

US 2020/0211501 A1 Jul. 2, 2020

Related U.S. Application Data

(60) Provisional application No. 62/786,205, filed on Dec. 28, 2018.

(51) Int. Cl.
*G09G 5/00* (2006.01)
*G09G 5/10* (2006.01)
(Continued)

(52) U.S. Cl.
CPC ............ *G09G 5/10* (2013.01); *G06F 1/3265* (2013.01); *G09G 5/026* (2013.01);
(Continued)

(58) Field of Classification Search
None
See application file for complete search history.

(56) References Cited

U.S. PATENT DOCUMENTS 5,598,565 A 1/1997 Reinhardt
6,339,417 B1 1/2002 Quanrur
(Continued)

FOREIGN PATENT DOCUMENTS

CN 106569584 4/2017
CN 105159635 3/2019
(Continued)

OTHER PUBLICATIONS

Green Definition. www.welovead.com/en/works/details/308whowwk, *National Geographic*. pp. 1-2.
(Continued)

*Primary Examiner* — Martin Mushambo
(74) *Attorney, Agent, or Firm* — Farjami & Farjami LLP

(57) ABSTRACT

According to one implementation, a system for enhancing energy efficiency during display of an image through selective reduction of pixel intensity includes a computing platform having a hardware processor and a memory storing a software code. The hardware processor is configured to execute the software code to receive a first image including multiple pixels and having a first display power consumption when displayed on a display, and to change the intensity of each of a predetermined subset of the pixels of the first image into a predetermined intensity to generate a second image. The second image has a second display power consumption when displayed on the display, the predetermined intensity being such that the second display power consumption is lower than the first display power consumption.

22 Claims, 4 Drawing Sheets

(51) Int. Cl.
*G06F 1/3234* (2019.01)
*G09G 5/02* (2006.01)

(52) U.S. Cl.
CPC ............... *G09G 2320/0626* (2013.01); *G09G 2330/021* (2013.01); *G09G 2354/00* (2013.01)

(56) References Cited

U.S. PATENT DOCUMENTS

| | | | |
|---|---|---|---|
| 7,193,622 B2 | 3/2007 | Sklovsky | |
| 7,614,011 B2 | 11/2009 | Karidis | |
| 8,354,993 B2 | 1/2013 | Mizushima | |
| 8,749,541 B2 | 6/2014 | Kim | |
| 9,129,558 B2 | 9/2015 | Song | |
| 9,330,594 B2 | 5/2016 | Tada | |
| 9,368,062 B2 | 6/2016 | Zhang | |
| 9,756,264 B2 | 9/2017 | Hoelter | |
| 9,767,728 B2 | 9/2017 | Evans | |
| 9,851,734 B2 | 12/2017 | Fujisawa | |
| 9,892,678 B2 | 2/2018 | Song | |
| 2007/0188440 A1 | 8/2007 | Hwang | |
| 2007/0204181 A1 | 8/2007 | Tsuji | |
| 2010/0141777 A1 | 6/2010 | Jin | |
| 2010/0149223 A1 | 6/2010 | Betts-LaCroix | |
| 2010/0332877 A1 | 12/2010 | Yarch | |
| 2012/0113153 A1* | 5/2012 | Casner | H04N 13/32 345/690 |
| 2012/0169637 A1 | 7/2012 | Jeong | |
| 2013/0328950 A1 | 12/2013 | Vasquez | |
| 2014/0068314 A1 | 3/2014 | Kim | |
| 2015/0379942 A1* | 12/2015 | Guo | G09G 3/3426 345/102 |
| 2017/0110069 A1* | 4/2017 | Shoshan | G09G 3/3413 |
| 2017/0153606 A1* | 6/2017 | Pitis | G04G 9/0082 |
| 2018/0033397 A1* | 2/2018 | Huang | G09G 3/3208 |
| 2018/0046002 A1 | 2/2018 | Zhao | |
| 2018/0084292 A1 | 3/2018 | Jiang | |
| 2018/0219764 A1 | 8/2018 | Oh | |
| 2018/0322679 A1* | 11/2018 | Kunkel | G06K 9/4652 |

FOREIGN PATENT DOCUMENTS

| | | |
|---|---|---|
| WO | 2012155560 | 11/2012 |
| WO | 2013143208 | 10/2013 |
| WO | 2017106712 | 6/2017 |
| WO | 2018021830 | 2/2018 |

OTHER PUBLICATIONS

Aguilar, Nelson. "Save Battery Life on Android by Turning Off Pixels (No Root Required)," *Gadget Hacks*, Dec. 2014. pp. 1-8.

Li, et al. "Making Image More Energy Efficient for OLED Smart Devices," *Hindawi Publishing Corporation*. Sep. 2016. pp. 1-9.

Yan, et al. "Too Many Pixels to Perceive: Subpixel Shutoff for Display Energy Reduction on OLED Smartphones," Proceedings of MM' 17, Mountain View, CA, Oct. 9. pp. 1-9.

Chen, et al. "FingerShadow: An OLED Power Optimization based on Smartphone Touch Interactions," *Microsoft Research*. Proceedings of the 6$^{th}$ USENIX Con. On Power-Aware Computing, 2014, pp. 1-22.

* cited by examiner

SELECTIVE REDUCTION OF PIXEL INTENSITY TO ENHANCE ENERGY EFFICIENCY DURING DISPLAY OF AN IMAGE

RELATED APPLICATIONS

The present application claims the benefit of and priority to a pending Provisional Patent Application Ser. No. 62/786,205, filed Dec. 28, 2018, and titled "Method and Apparatus for Reducing the Energy Consumption of a Display," which is hereby incorporated fully by reference into the present application.

BACKGROUND

Although electrical power is often perceived to be a clean source of energy by consumers due to the absence of perceivable environmental impact at the point at which it is used, the generation of electrical power can have significant negative environmental effects. For example, most of the electrical power presently used in the United States is generated by natural gas or coal fired power plants known to contribute to the accumulation of greenhouse gases. As a result, it is desirable to reduce the consumption of electrical power wherever feasible.

One area in which electrical power may sometimes be over utilized is in the display screens used in computer monitors, televisions, gaming systems, and mobile communication devices. The recent trend in display technology is to support ever higher resolutions, such as the 4K and 8K video formats, for example, which require the use of more and more pixels for display of an image. While the quality of the images provided on modern high-definition (HD) and ultra HD displays is undeniably impressive, the level of detail they provide may not be necessary or even desirable in many use cases. For example, although high resolution images may be desirable for intense gaming applications, or movies shot specifically for high resolution viewing, other content, such as documentaries or educational programming for instance, may be enjoyed without substantial compromise at lower resolutions. Accordingly, there is a need in the art for a solution enabling the selective reduction in power consumption by a display in appropriate use cases.

SUMMARY

There are provided systems and methods for enhancing energy efficiency during display of an image through selective reduction of pixel intensity, substantially as shown in and/or described in connection with at least one of the figures, and as set forth more completely in the claims.

DETAILED DESCRIPTION

Figure 1:
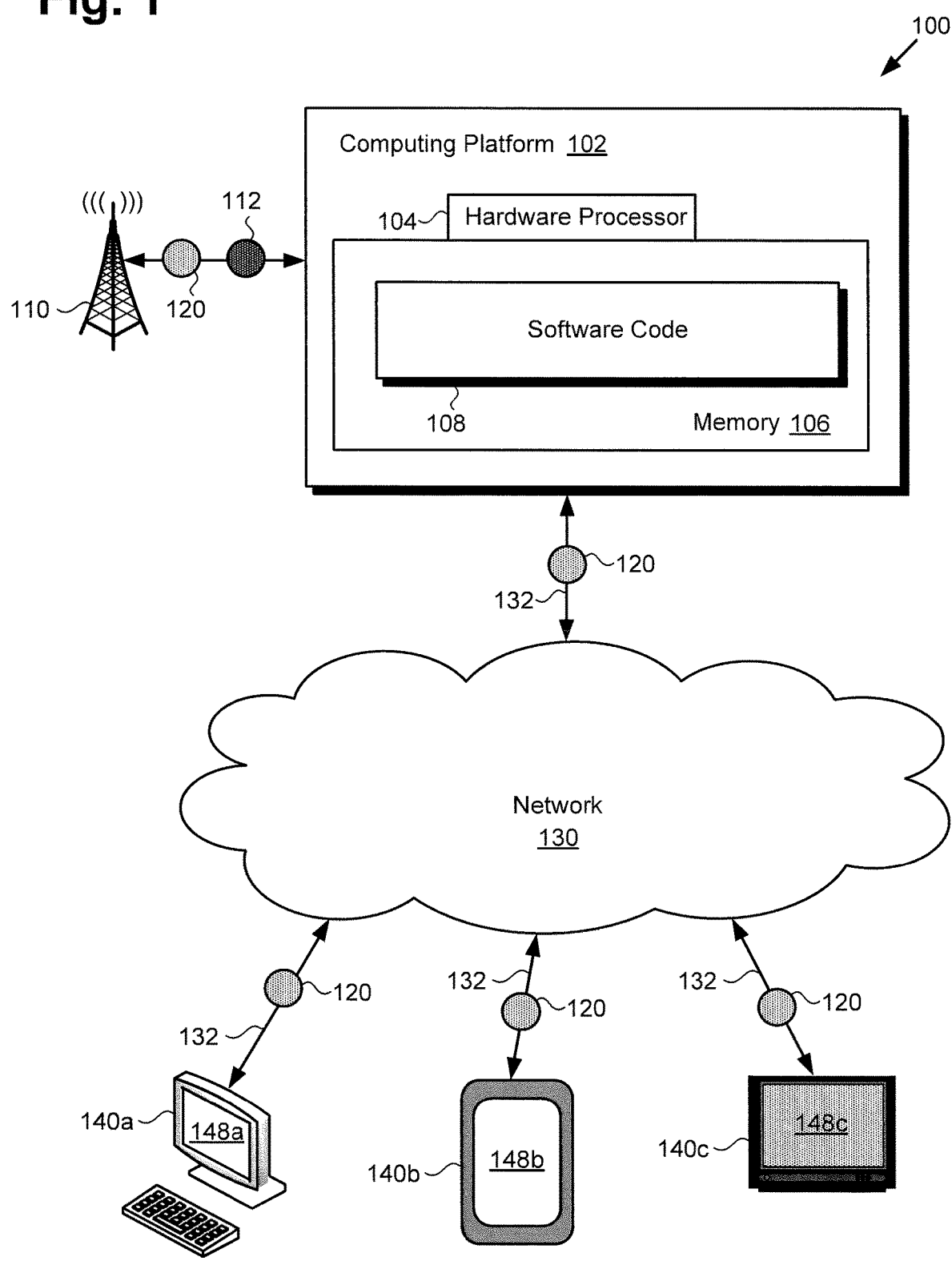
FIG. 1 shows an exemplary system for enhancing energy efficiency during display of an image through selective reduction of pixel intensity, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for enhancing energy efficiency during display of an image through selective reduction of pixel intensity that address and overcome the deficiencies in the conventional art. In some implementations, the systems and methods disclosed by the present application may be substantially or fully automated. It is noted that, as used in the present application, the terms "automation," "automated", and "automating" refer to systems and processes that do not require the participation of a human analyst or editor. Although, in some implementations, a human supervisor may sample or otherwise review the images generated by the automated systems and according to the automated methods described herein, that human involvement is optional. Thus, the methods described in the present application may be performed under the control of hardware processing components of the disclosed automated systems.

FIG. 1 shows exemplary system 100 for enhancing energy efficiency during display of an image through selective reduction of pixel intensity, according to one implementation. As shown in FIG. 1, system 100 includes computing platform 102 having hardware processor 104 and memory 106 implemented as a non-transitory storage device. According to the present exemplary implementation, memory 106 stores software code 108.

As further shown in FIG. 1, system 100 is implemented within a use environment including content broadcast source 110 providing first image 112 to system 100 and receiving second image 120 corresponding to first image 112 from system 100. The use environment also includes user systems 140a, 140b, and 140c (hereinafter "user systems 140a-140c") receiving second image 120 from system 100 via communication network 130. Also shown in FIG. 1 are network communication links 132 of communication network 130 interactively connecting system 100 with user systems 140a-140c, and displays 148a, 148b, and 148c (hereinafter "displays 148a-148c") of respective user systems 140a-140c. As discussed in greater detail below, first image 112 provided by content broadcast source 110 has a first display power consumption when displayed on a display, while second image 120 corresponding to first image 112 and output by system 100 has a second power consumption lower than the first power consumption when displayed on the display, such as one or more of displays 148a-148c.

Although the present application refers to software code 108 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102 or to respective hardware processors of user systems 140a-140c. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs such as DVDs, RAM, programmable read-only memory (PROM), erasable PROM (EPROM), and FLASH memory.

Moreover, although FIG. 1 depicts single computing platform 102, system 100 may include one or more computing platforms corresponding to computing platform 102, such as computer servers for example, which may be co-located, or may form an interactively linked but distributed system, such as a cloud-based system, for instance. As a result, hardware processor 104 and memory 106 may correspond to distributed processor and memory resources within system 100. In one such implementation, computing platform 102 may correspond to one or more web servers accessible over a packet-switched network such as the Internet, for example. Alternatively, computing platform 102 may correspond to one or more computer servers supporting a wide area network (WAN), a local area network (LAN), or included in another type of private or limited distribution network. Furthermore, in some implementations, system 100 may be implemented virtually, such as in a data center. For example, in some implementations, system 100 may be implemented in software, or as virtual machines.

It is further noted that, although user systems 140a-140c are shown variously as desktop computer 140a, smartphone 140b, and smart television (smart TV) 140c, in FIG. 1, those representations are provided merely by way of example. In other implementations, user systems 140a-140c may take the form of any suitable mobile or stationary computing device or system that implements data processing capabilities sufficient to provide a user interface, support connections to communication network 130, and implement the functionality ascribed to user systems 140a-140c herein. That is to say, in other implementations, one or more of user systems 140a-140c may take the form of a laptop computer, tablet computer, digital media player, gaming console, or a wearable communication device such as a smartwatch, to name a few examples. It is also noted that displays 148a-148c may take the form of liquid crystal displays (LCDs), light-emitting diode (LED) displays, organic light-emitting diode (OLED) displays, quantum LED (QLED) displays, or any other suitable display screens that perform a physical transformation of signals to light.

In one implementation, content broadcast source 110 may be a media entity providing video including first image 112. First image 112 may be a video image in a frame of video from a linear TV program stream, for example, that includes a high-definition (HD) or ultra-HD (UHD) baseband video signal with embedded audio, captions, time code, and other ancillary metadata, such as ratings and/or parental guidelines. In some implementations, the content provided by content broadcast source 110 and including first image 112 may also include multiple audio tracks, and may utilize secondary audio programming (SAP) and/or Descriptive Video Service (DVS), for example.

Alternatively, in some implementations, first image 112 may be part of a frame of video from a video game. However, it is noted that in some implementations, first image 112 may not be a video image, but rather may be an individual still life image, or a digital photograph, for example.

The content provided by content broadcast source 110 and including first image 112 may be the same source video that is broadcast to a traditional TV audience. Thus, content broadcast source 110 may take the form of a conventional cable and/or satellite TV network, for example. As depicted in FIG. 1, content broadcast source 110 may find it advantageous or desirable to make content including first image 112 available via an alternative distribution channel, such as communication network 130, which may take the form of a packet-switched network, for example, such as the Internet, as noted above. For instance, system 100 may be utilized by content broadcast source 110 to distribute content including second image 120 corresponding to first image 112 as part of a program stream, which may be an Internet Protocol (IP) programming stream provided by a streaming service, or a video-on-demand (VOD) service.

Figure 2:
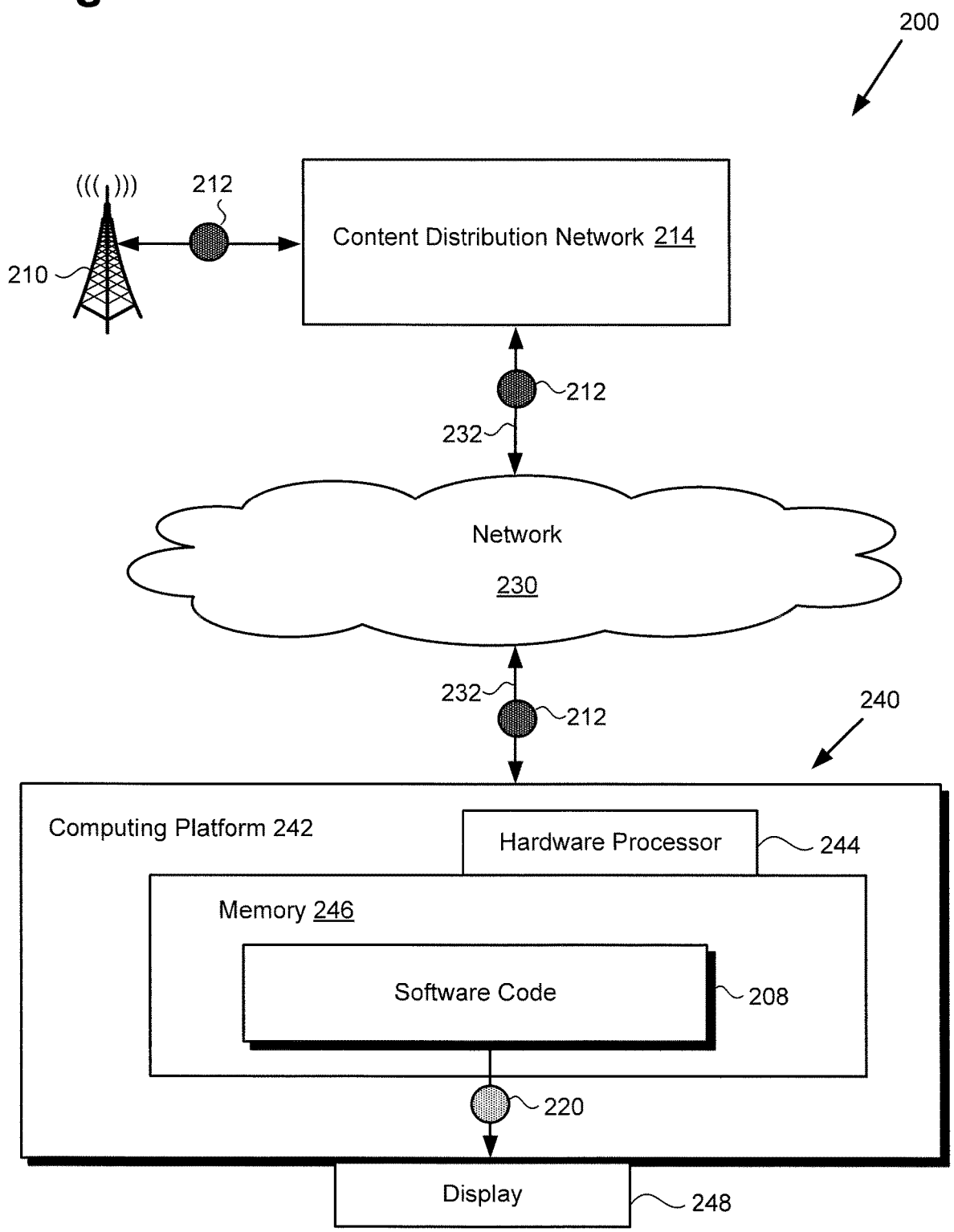
FIG. 2 shows another exemplary implementation of a system for enhancing energy efficiency during display of an image through selective reduction of pixel intensity.

FIG. 2 shows another exemplary system, i.e., user system 240, for enhancing energy efficiency during display of an image through selective reduction of pixel intensity. As shown in FIG. 2, user system 240 includes computing platform 242 having hardware processor 244, memory 246 implemented as a non-transitory storage device storing software code 208, and display 248. It is noted that, in various implementations, display 248 may be physically integrated with user system 240 or may be communicatively coupled to but physically separate from user system 240. For example, where user system 240 is implemented as a smartphone, laptop computer, or tablet computer, display 240 will typically be integrated with user system 240. By contrast, where user system 240 is implemented as a desktop computer, display 240 may take the form of a monitor separate from computing platform 242 in the form of a computer tower.

As further shown in FIG. 2, user system 240 is utilized in use environment 200 including content broadcast source 210 providing first image 212 to content distribution network 214, which in turn distributes first image 212 to user system 240 via communication network 230 and network communication links 232. According to the implementation shown in FIG. 2, software code 208 stored in memory 246 of user system 240 is configured to receive first image 212 as an input and to output second image 220 corresponding to first image 212 for display on user system display 248.

Content broadcast source 210, first image 212, second image 220, communication network 230, and network communication links 232 correspond respectively in general to content broadcast source 110, first image 112, second image 120, communication network 130, and network communication links 132, in FIG. 1. In other words, content broadcast source 210, first image 212, second image 220, communication network 230, and network communication links 232 may share any of the characteristics attributed to respective content broadcast source 110, first image 112, second image 120, communication network 130, and network communication links 132 by the present disclosure, and vice versa. As discussed in greater detail below, first image 212 provided by content broadcast source 210 has a first display power consumption when displayed on display 248 of user system 240, while second image 220 corresponding to first image 212 and output by system 200 has a second power consumption lower than the first power consumption when displayed on display 248 of user system 240.

User system 240 and display 248 correspond respectively in general to any or all of user systems 140a-140c and respective displays 148a-148c in FIG. 1. Thus, user systems 140a-140c and displays 148a-148c may share any of the characteristics attributed to respective user system 240 and display 248 by the present disclosure, and vice versa. That is to say, like displays 148a-148c, display 248 may take the form of an LCD, LED display, OLED display, or QLED display, for example. Moreover, although not shown in FIG. 1, each of user systems 140a-140c may include features corresponding respectively to computing platform 242, hardware processor 244, and memory 246 storing software code 208.

Hardware processor 244 may be the central processing unit (CPU) for user system 240, for example, in which role hardware processor 244 runs the operating system for user system 240 and executes software code 208. Software code 208 corresponds in general to software code 108, in FIG. 1, and is capable of performing all of the operations attributed software code 108 by the present disclosure. In other words, in implementations in which client hardware processor 244 executes software code 208 stored locally in memory 246, user system 240 may perform any of the actions attributed to system 100 by the present disclosure. Thus, in some implementations, software code 208 executed by hardware processor 244 of user system 240 may receive first image 212 having a first display power consumption when displayed on display 248, may generate second image 220 corresponding to first image 212 but having a second power consumption lower than the first power consumption when displayed on display 248, and may output second image 220 for display on display 248.

Figure 3:
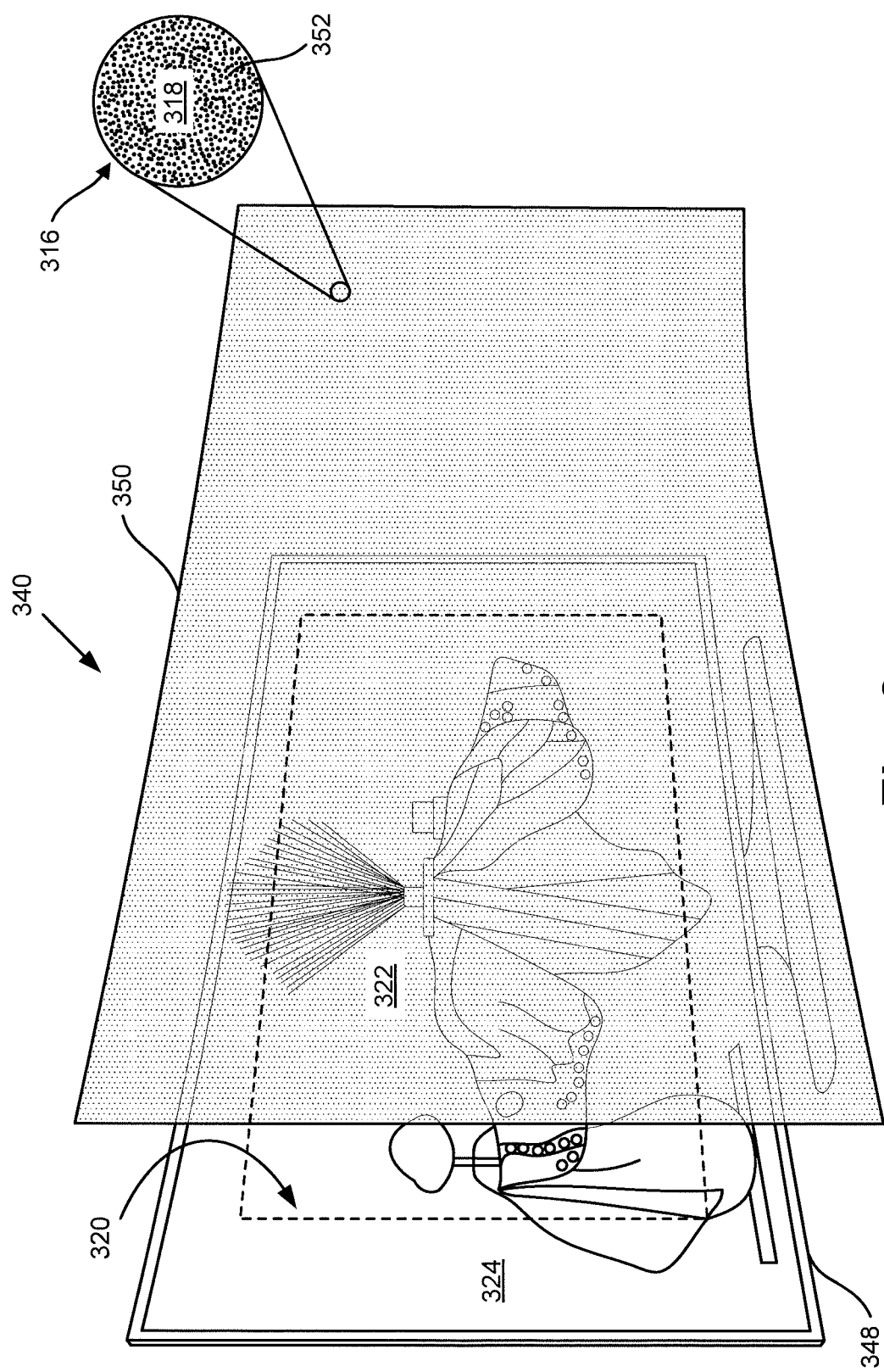
FIG. 3 shows an exemplary display of a system for enhancing energy efficiency during display of an image through selective reduction of pixel intensity.

FIG. 3 shows exemplary display 348 of user system 340 for enhancing energy efficiency during display of an image through selective reduction of pixel intensity. As shown in FIG. 3, second image 320 including central image region 322 and image border region 324 is displayed on display 348. User system 340, display 348, and second image 320 correspond respectively in general to user system(s) 140a-140c/240, display(s) 148a-148c/248, and second image 120/220 in FIGS. 1 and 2. As a result, user system 340, display 348, and second image 320 may share any of the characteristics attributed to respective user system(s) 140a-140c/240, display(s) 148a-148c/248, and second image 120/220 by the present disclosure, and vice versa. That is to say, like display(s) 148a-148c/248, display 348 may take the form of an LCD, LED display, OLED display, QLED display, or any, other suitable display screen that performs a physical transformation of signals to light.

In addition, although not shown in FIG. 3, user system 340 may include features corresponding respectively to computing platform 242, hardware processor 244, and system memory storing software code 208, in FIG. 2. Moreover, like second image 120/220, second image 320 is a lower resolution version of first image 112/212, thereby resulting in a lower power consumption when second image 320 is displayed on display 348 (as compared to display of first image 112/212).

FIG. 3 also shows mask 350 used to change the intensity of each pixel of a predetermined subset of the pixels included in first image 112/212 into a predetermined intensity to generate second image 320. For example region 316 shows pixels 318 of first image 112/212 that include a subset of pixels, shown by exemplary black pixel 352, having their intensities reduced in second image 320. It is noted that exemplary black pixel 352 is shown in FIG. 3 in the interests of conceptual clarity, more generally, exemplary black pixel 352 is representative of an at least partially opaque pixel. Thus, while in some implementations the subset of pixels represented by black pixel 352 may be substantially opaque or "black", in other implementations the subset of pixels represented by black pixel 352 may be at least partially opaque so as to have a reduced brightness compared to pixels not included in the predetermined subset of pixels.

Figure 4:
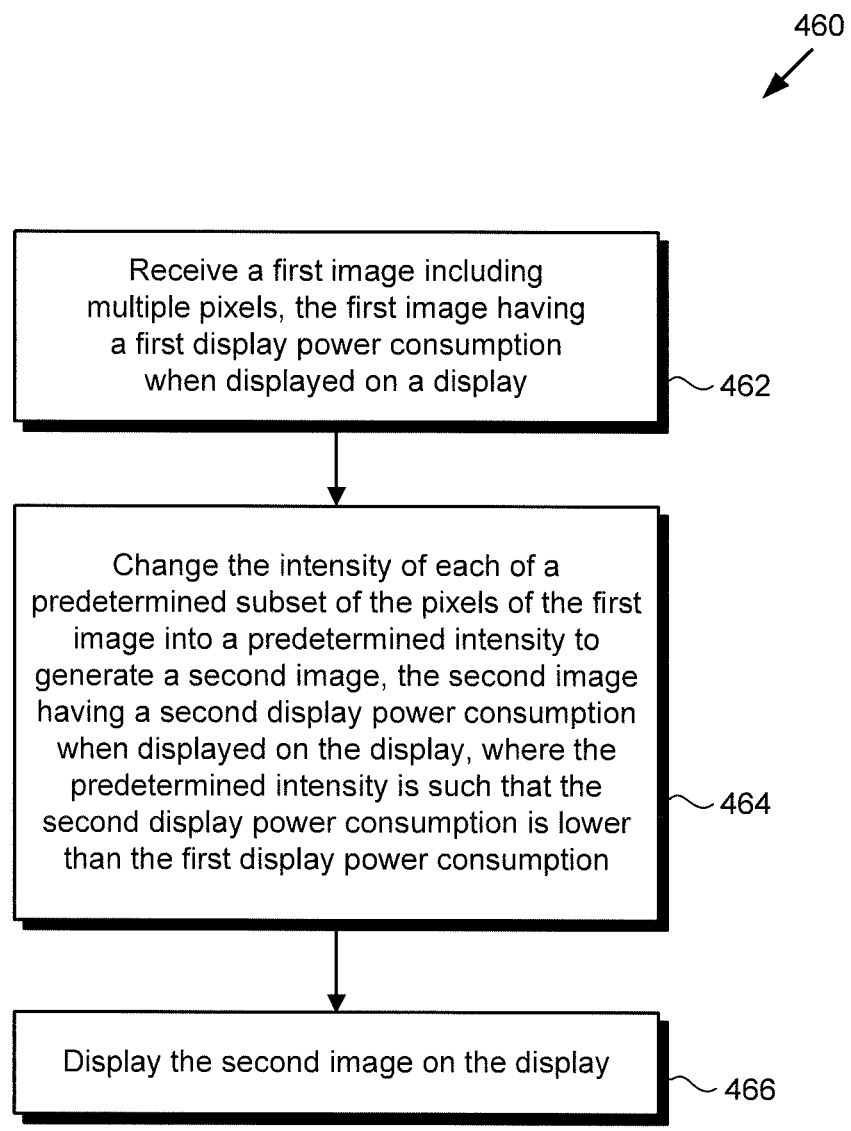
FIG. 4 shows a flowchart presenting an exemplary method for enhancing energy efficiency during display of an image through selective reduction of pixel intensity, according to one implementation.

The functionality of software code 108/208 will be further described by reference to FIG. 4. FIG. 4 shows flowchart 460 presenting an exemplary method for use by a system, such as system 100 or user system(s) 140a-140c/240/340, for enhancing energy efficiency during display of an image through selective reduction of pixel intensity, according to one implementation.

Referring now to FIG. 4 in combination with FIGS. 1, 2, and 3, flowchart 460 begins with receiving first image 112/212 having a first display power consumption when displayed on display(s) 148a-148c/248/348, first image 112/212 including multiple pixels 318 (action 462). As noted above, first image 112/212 may be a video image in a frame of video from a linear TV program stream, for example, including an HD or UHD baseband video signal. Alternatively, in some implementations, first image 112/212 may be part of a frame of video from a video game, or may be a non-video image, such as an individual still life image or a digital photograph, for example.

Referring specifically to FIG. 1, in some implementations, first image 112 may be provided to system 100 by content broadcast source 110, which may be a conventional cable and/or satellite TV network, for example. In those implementations, first image 112 may be received by software code 108, executed by hardware processor 104 of system 100.

Alternatively, or in addition, referring to FIG. 2, in some implementations, first image 212 may be provided to content distribution network 214 by content broadcast source 210 for distribution as streaming content, for example. In those implementations, first image 212 may be received by software code 208, executed by hardware processor 244 of user system 240, via communication network 230 and network communication links 232.

Flowchart 460 continues with changing the intensity of each of a predetermined subset of pixels of first image 112/212 into a predetermined intensity to generate second image 120/220/320, wherein second image 120/220/320 has a second display power consumption when displayed on display(s) 148a-148c/248/348, and wherein the predetermined intensity is such that the second display power consumption is lower than the first display power consumption (action 464). Referring specifically to FIG. 3, as noted above, in some implementations, action 464 may be accomplished by applying mask 350, in the form of a Portable Network Graphic (.png) file having a masking pattern, for example, to overlay the first image.

For instance, changing the intensity of each of the predetermined subset of the pixels of the first image may include applying mask 350 to the first image to cause each of the predetermined subset of the plurality of pixels to be an at least partially opaque pixel, such as black pixel 352, when second image 320 is displayed on display 348. In some implementations, application of mask 350 to the first image may cause every other pixel of pixels 318 of the first image to be at least partially opaque in second image 320.

According to other implementations, application of mask 350 to the first image may cause neighboring pixels of pixels 318 of the first image to be at least partially opaque pixels in second image 320. For example, in some use cases, the picture quality or resolution of central image region 322 of second image 320 may be very important for full enjoyment and appreciation of second image 320 by a user of user system 340, but the picture quality or resolution of image border region 324 may be substantially less so. In those implementations, relatively few or none of pixels 318 in central image region 322 may be partially opaque or black pixels 352 in second image 320. However, in order to reduce power consumption during display of second image 320 in those use cases, two or more neighboring, i.e., adjacent pixels 318 in image border region 324 may be partially opaque pixels in second image 320. In other words, the number of pixels modified so as to be at least partially opaque in central image region 322 of second image 320 is less than the number of pixels modified so as to be at least partially opaque in image border region 324.

It is noted that in some implementations, the respective regions of the first image identified as central image region 322 and image border region 324 may be determined by broadcast source 110/210 or content distribution network 214. However, in other implementations, the boundaries of central image region 322 and image border region 324 may be determined based on selections made by a user of user system 240/340. It is further noted that central image region 322 and image border region 324 may scale depending on the size of display(s) 148a-148c/248/348.

Referring to FIGS. 1 and 3 in combination, in some implementations in which changing the intensity of each of the predetermined subset of the pixels of first image 112 into the predetermined intensity includes application of mask 350 to first image 112, action 464 may be performed by software code 108 of system 100, executed by hardware processor 104. However, referring to FIGS. 2 and 3, in other such implementations, changing the intensity of each of the predetermined subset of the pixels of first image 212 into the predetermined intensity through application of mask 350 to first image 212, may be performed locally on user system 240/340, by software code 208, executed by hardware processor 244.

Referring once again to FIGS. 1 and 3 in combination, in some implementations, action 464 may result in second image 120/320 being generated as a compressed image omitting the predetermined subset of the pixels of first image 112 depicted as black pixels 352. In some of those implementations, compressed second image 120/320 may omit every other pixel of pixels 318 of first image 112. Alternatively, in some implementations, it may be advantageous or desirable to omit fewer or none of the pixels in central image region 322 of second image 120/320. However, in order to reduce power consumption during display of second image 120/320 in those use cases, two or more neighboring, i.e., adjacent pixels 318 in image border region 324 may be omitted from compressed second image 120/320. In implementations in which changing the intensity of each of the predetermined subset of the pixels of first image 112 into the predetermined intensity includes selectively omitting pixels to generate compressed second image 120/320 corresponding to first image 112, action 464 may be performed by software code 108 of system 100, executed by hardware processor 104.

In some implementations, flowchart 460 can conclude with action 464, described above. However, in other implementations, flowchart 460 continues with displaying second image 120/220/320 on display(s) 148a-148c/248/348 (action 466). Action 466 may be performed by hardware processor 244 of user system(s) 140a-140c/240/340.

It is noted that, according to some implementations, the actions described by flowchart 460 may be performed in response to an input to user system(s) 140a-140c/240/340 by a user of those systems prior to display of second image 120/220/320. That is to say, depending on the preference of the user for a higher or lower resolution viewing experience, the user may choose to opt in to the selective reduction of pixel intensity process disclosed herein in order to reduce display power consumption. Alternatively, or in addition, where the actions described in flowchart 460 are a predetermined default procedure for the display of some images, the user may have the option to opt in or out of the selective reduction of pixel intensity process, before or during the playing, in order to view those images or video at a higher resolution, e.g. using a selection button or a selection tab.

It is further noted that the method outlined by flowchart 460 can advantageously result in substantial reduction in the second display power consumption during display of second image 120/220/320 when compared to the first display power consumption resulting from display of first image 112/212 by display(s) 148a-148c/248/348. For example, when display(s) 148a-148c/248/348 take the form of OLED or QLED display(s), the second display power consumption may be approximately fifty percent of the first power consumption.

In another implementation, an example method that may be performed by computing platform 242 comprises receiving, using hardware processor 244, a plurality of video frames including a first video frame having a first display power consumption when displayed on a display, where the first video frame includes a first plurality of pixels. The example method further comprises changing, using hardware processor 244, an intensity of each of a predetermined subset of the first plurality of pixels of the first video frame into a predetermined intensity to generate a second video frame, where the second video frame has a second display power consumption when displayed on the display, and where the predetermined intensity is such that the second display power consumption is lower than the first display power consumption.

In one implementation, the same changing may be applied to each of the plurality of video frames using the same mask design such that the same pattern of black or at least partially opaque pixels is overlaid on each of the plurality of video frames. In another implementation, different changing may be applied to each of the plurality of video frames using different mask designs such that one of the plurality of video frames has a first pattern of black or at least partially opaque pixels overlaid thereon by a first mask having a first design, and another one of the plurality of video frames has a second pattern of black or at least partially opaque pixels overlaid thereon by a second mask having a second design different from the first design. Further, the changing may occur in response to a user selection of a lower power consumption mode, where the user selection of the lower power consumption mode may be received before or during rendering the plurality of video frames on the display. The user may manually select the lower power consumption mode on the user system, or selection of the lower power consumption mode may be automatic, for example, if the user has an account including profile information indicating that the user's default display mode is the lower power consumption mode.

Thus, the present application discloses systems and methods for enhancing energy efficiency during display of an image through selective reduction of pixel intensity that address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a computing platform including a hardware processor and a memory storing a software code;
the hardware processor being configured to execute the software code to:
receive a first image having a first display power consumption when displayed on a display, the first image including a plurality of pixels; and
change an intensity of each of a predetermined subset of the plurality of pixels of the first image into a predetermined intensity to generate a second image, wherein the second image has a second display power consumption when displayed on the display, and wherein the predetermined intensity is such that the second display power consumption is lower than the first display power consumption.

2. The system of claim 1, further comprising the display, and wherein the hardware processor is further configured to display the second image on the display.

3. The system of claim 1, wherein changing the intensity of each of the predetermined subset of the plurality of pixels of the first image comprises applying a mask to the first image to cause each of the predetermined subset of the plurality of pixels to be an at least partially opaque pixel when the second image is displayed on the display.

4. The system of claim 3, wherein applying the mask to the first image causes each of the predetermined subset of the plurality of pixels to be a black pixel when the second image is displayed on the display.

5. The system of claim 1, wherein every other pixel of the plurality of pixels of the first image is an at least partially opaque pixel in the second image.

6. The system of claim 1, wherein a plurality of neighboring pixels of the plurality of pixels of the first image are at least partially opaque pixels in the second image.

7. The system of claim 1, wherein the second image comprises a central image region and an image border region at a boundary of the central image region, and wherein changing the intensity of each of the predetermined subset of the plurality of pixels of the first image causes a plurality of pixels in the image border region to be at least partially opaque when the second image is displayed on the display.

8. The system of claim 1, wherein the second image is a compressed image omitting the predetermined subset of the plurality of pixels of the first image.

9. The system of claim 8, wherein the compressed image omits every other pixel of the plurality of pixels of the first image or a plurality of neighboring pixels of the plurality of pixels of the first image.

10. A method for use by a system including a computing platform having a hardware processor and a memory storing a software code, the method comprising:
receiving, by the software code executed by the hardware processor, a first image having a first display power consumption when displayed on a display, the first image including a plurality of pixels; and
changing, by the software code executed by the hardware processor, an intensity of each of a predetermined subset of the plurality of pixels of the first image into a predetermined intensity to generate a second image, wherein the second image has a second display power consumption when displayed on the display, and wherein the predetermined intensity is such that the second display power consumption is lower than the first display power consumption.

11. The method of claim 10, wherein the system further comprises the display, the method further comprising displaying, by the hardware processor, the second image on the display.

12. The method of claim 10, wherein changing the intensity of each of the predetermined subset of the plurality of pixels of the first image comprises applying a mask to the first image to cause each of the predetermined subset of the plurality of pixels to be an at least partially opaque pixel when the second image is displayed on the display.

13. The method of claim 12, wherein applying the mask to the first image to causes each of the predetermined subset of the plurality of pixels to be a black pixel when the second image is displayed on the display.

14. The method of claim 10, wherein every other pixel of the plurality of pixels of the first image is an at least partially opaque pixel in the second image.

15. The method of claim 10, wherein a plurality of neighboring pixels of the plurality of pixels of the first image are at least partially opaque pixels in the second image.

16. The method of claim 10, wherein the second image is a compressed image omitting the predetermined subset of the plurality of pixels of the first image.

17. The method of claim 16, wherein the compressed image omits every other pixel of the plurality of pixels of the first image or a plurality of neighboring pixels of the plurality of pixels of the first image.

18. The method of claim 10, wherein the second image comprises a central image region and an image border region at a boundary of the central image region, and wherein changing the intensity of each of the predetermined subset of the plurality of pixels of the first image causes a plurality of pixels in the image border region to be at least partially opaque when the second image is displayed on the display.

19. A method for use by a system including a computing platform having a hardware processor and a memory storing a software code, the method comprising:
receiving, by the software code executed by the hardware processor, a plurality of video frames including a first video frame having a first display power consumption when displayed on a display, the first video frame including a first plurality of pixels; and
changing, by the software code executed by the hardware processor, an intensity of each of a predetermined subset of the first plurality of pixels of the first video frame into a predetermined intensity to generate a second video frame, wherein the second video frame has a second display power consumption when displayed on the display, and wherein the predetermined intensity is such that the second display power consumption is lower than the first display power consumption.

20. The method of claim 19, wherein the changing is applied to each of the plurality of video frames.

21. The method of claim 19, wherein the changing occurs in response to a user selection of a lower power consumption mode.

22. The method of claim 21, wherein the user selection of the lower power consumption mode is received during a rendering the plurality of video frames on the display.

* * * * *